Sept. 30, 1952  L. M. PERSONS  2,612,188
SOLENOID-OPERATED GAS VALVE
Filed April 11, 1947  2 SHEETS—SHEET 1

INVENTOR:
LAWRENCE M. PERSONS
ATTORNEYS.

Sept. 30, 1952  L. M. PERSONS  2,612,188
SOLENOID-OPERATED GAS VALVE
Filed April 11, 1947  2 SHEETS—SHEET 2

INVENTOR:
LAWRENCE M. PERSONS

ATTORNEYS.

Patented Sept. 30, 1952

2,612,188

UNITED STATES PATENT OFFICE 2,612,188

SOLENOID-OPERATED GAS VALVE

Lawrence M. Persons, Chesterfield, Mo., assignor to McQuay-Norris Manufacturing Company, St. Louis, Mo., a corporation of Delaware Application April 11, 1947, Serial No. 740,786

2 Claims. (Cl. 137—719)

This invention relates generally to gas valves and particularly to electromagnetically-operated gas valves, such as are frequently utilized in thermostatically - controlled gas - burning furnaces and the like.

Gas valves of the character referred to are generally installed in situations where the electric power available for their operation is alternating current. The environment is also such as to render hum or noise extremely undesirable and it is also indispensable that the valve be entirely reliable, not only for shutting off the gas when the electromagnetic means is deenergized, but also for opening the valve, when conditions require, against gas line pressures even in excess of those normally encountered.

The object of the present invention, generally stated, is to provide a solenoid-operated gas valve for energization by alternating currents and which is capable, with low power input, of opening the valve against relatively high gas pressures.

A further object of the invention is to assure the centering of the valve stem without utilizing gripping springs.

Other objects will become apparent to those skilled in the art when the following description is read in connection with the accompanying drawings, in which.

In accordance with the invention, a solenoid-operated gas valve is provided, as customary, with an apertured partition dividing the body of the valve, and a tappet-type valve head is utilized to close the aperture in said partition. In accordance with the present invention, the valve is connected to the source of gas supply so that the pressure of the supply is exerted in a direction tending to hold the valve head closed, i. e., seated in the aperture. It is also desirable that the valve head be so situated as to be biased by gravity toward its closed position. Consequently a suitable solenoid is arranged for lifting the valve from its seat when the solenoid is energized.

The present invention is particularly characterized by the provision of a solenoid whose magnetic path is arranged so as to maintain the valve head properly centered with respect to the aperture in the aforesaid partition, and the alternating current hum at the same time eliminated by the arrangement of a laterally extending armature arranged to engage the end surface of the solenoid, preferably at three points, so as to complete a magnetic circuit through said armature. A further feature of the invention consists in the provision of a shading coil adjacent the armature just mentioned, so that the shading coil circuit is activated only when the armature approaches or engages the end surface of the solenoid. The arrangement of the shading coil in this position not only maintains the out-of-phase magnetic circuit and thus eliminates hum when the valve is fully open, but removes the shading coil from the principal magnetic circuit when the valve is in or near its closed position thereby to relieve the solenoid, during the period of its maximum effort, of power losses incident to the shading circuit.

Figure 1:
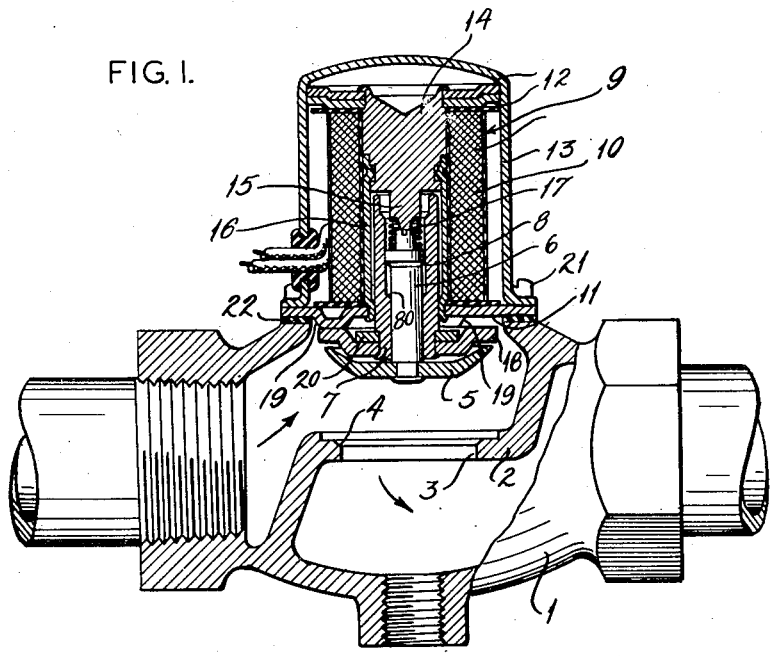
Figure 1 is a view in side elevation (part being shown in section) showing the solenoid-actuated gas valve of the present invention in one extreme position.

Referring now to Figure 1 of the drawings, the valve shown may comprise a body I having a central partition 2, provided with an aperture 3 formed to provide a valve seat 4. A closure member 5 is arranged to seat upon seat 4, thus closing the aperture 3.

Figure 2:
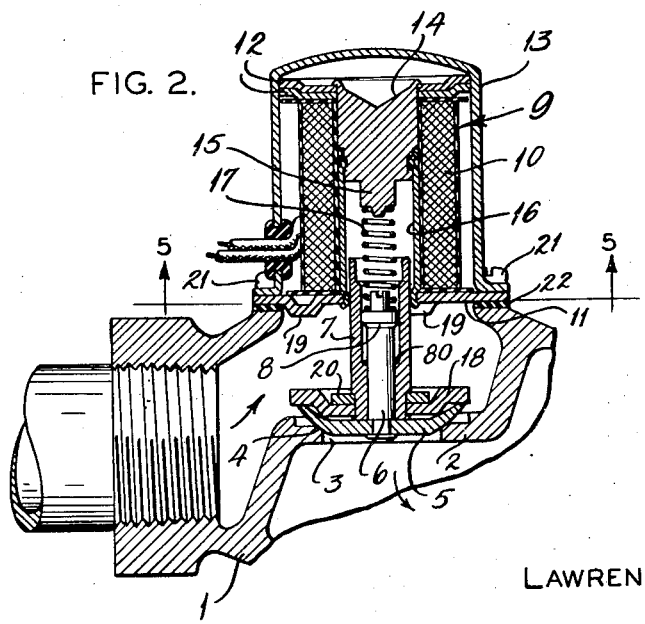
Figure 2 is a partial view corresponding to Figure 1, but showing the valve in closed position.
Figure 4:
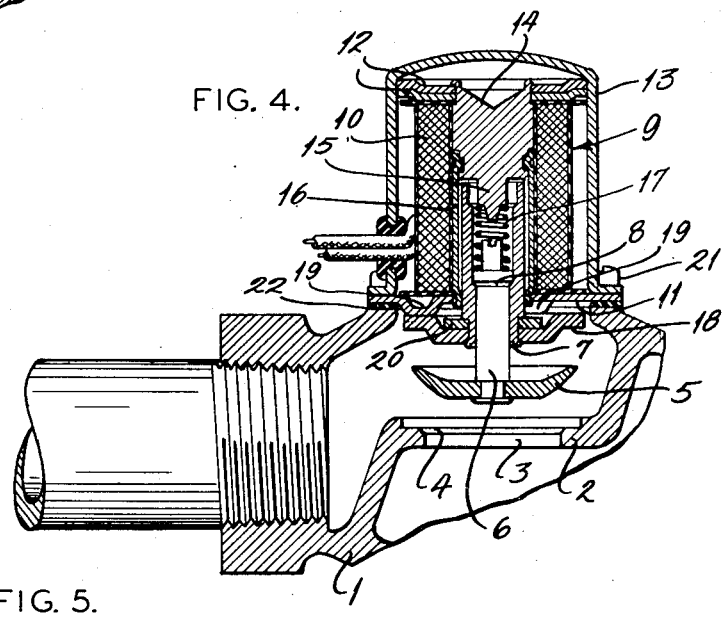
Figure 5:
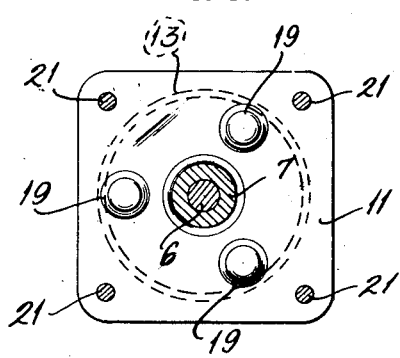
Figure 5 is a lower end view of the solenoid taken adjacent line 5—5 of Figure 2.

To move the valve head 5 between the fully open position, shown in Figure 4, and the fully closed position, shown in Figure 2, gravity may be relied upon, but to move the valve from closed to open position, a solenoid is provided for electromagnetically moving a telescopic stem, consisting of an inner non-magnetic element 6 connected directly to the head 5 and an outer magnetic element 7 arranged for limited telescopic movement relative to element 6. The extensibility of the telescopic members 6 and 7 is limited by shoulders 8 and 80. The element 7 constitutes the axially movable core of a solenoid, indicated generally by the reference character 9, which consists of a coil of wire 10 having a fixed magnetic end plate 11 at the lower end thereof, and fixed magnetic end plates 12 at the upper end thereof, all enclosed within a casing 13 constituting the external path for the magnetic flux set-up upon energization of coil 10. Centrally disposed within the coil 10 is a stationary core piece 14 having a central projection 15. The core piece 14 is in direct contact with the upper end plates 12, which are in direct contact with the housing 13, which latter is in direct contact with the lower end plate 11, but the latter is magnetically separated from the core piece 14 and, in fact, magnetically separated in radial direction from the telescopic stem 6—7. The latter separation is assured by the interposition of a sleeve 16 preferably formed of non-magnetic, stainless steel, but any suitable gas-impervious non-magnetic material, preferably one having a very high electrical resistance, may be utilized in the place of stainless steel.

A coiled spring 17 is interposed between the stationary core piece 14 and the upper end of the inner element 6 of the telescopic stem, said spring tending to bias the stem toward the position whereat the valve is closed.

Upon the lower end of the outer element 7 of the telescopic stem, a radially extending disc 18 of magnetic material is affixed, so as to constitute a movable armature engageable with the lowermost part of the fixed magnetic circuit, namely, plate 11. In order to assure that the disc 18 will seat upon the lowermost plate 11 in such manner that there will be no tendency to wobble or vibrate incident to the alternating current which energizes coil 10, the points of engagement between the disc 18 and the plate 11 are confined to three limited areas 19. In the embodiment shown, such limitation of the area of contact is provided by upsetting three bosses in the lowermost end plate 11, but obviously the bosses may be upset in the disc 18 or alternatively small projections provided thereon, so as to assure three-point contact between a planar surface on one of the elements (disc 18 in the embodiment shown) and the projections on the other element (end plate 11 in the embodiment shown).

Immediately above disc 18, a shading ring 20 is provided completely encircling the reduced portion of exterior element 7 of the telescopic stem. Such a shading ring may be formed of copper or other suitable highly conductive material and it will be evident that, with the shading ring thus positioned, the same is subject to induction of electromotive forces only when the parts are in the position whereat the magnetic flux of the solenoid travels through armature 18 to element 7. When the parts are in the position shown in Figure 2, for example, the shading ring 20 is completely out of the magnetic circuit and no power is consumed in energizing the shading ring circuit. To move the parts from the position shown in Figure 2 requires the maximum of power and consequently the removal of the shading ring from the magnetic circuit at this stage increases the ability of the solenoid to do its greatest work.

It will be understood, of course, that the members 7, 11, 12, 13, 14, and 18 are formed of magnetic material and, as pointed out hereinabove, stem 6 and sleeve 16 are formed of non-magnetic material. The parts 11, 16, and 14 are essentially so secured together as to hermetically seal off the space on the lower side thereof as these parts complete the end closure of the valve 1.

The solenoid 9 may be connected to the valve body 1 in any suitable manner, as, for example, by screws 21 and a suitable gasket 22.

Figure 3:
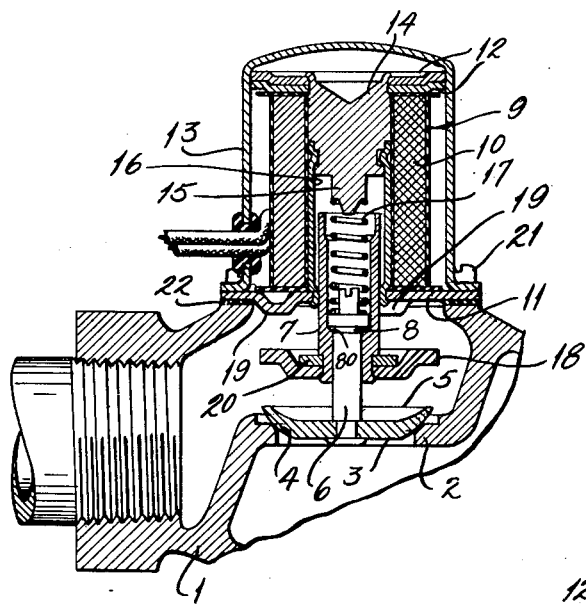
Figures 3 and 4 are corresponding views respectively showing the valve in intermediate and open positions.

In the operation of the device, assuming the parts to be in the position shown in Figure 2, energization of the solenoid tends to move the telescopic stem of the valve upwardly. In the event that the head 5 should be stuck on its seat, the exterior stem element 7 with disc 18 is nonetheless free to move and will move readily because the gas pressure is the same on both sides of disc 18. When the solenoid moves the elements 7 and 18 from the position shown in Figure 2 to the position shown in Figure 3, the parts have gained sufficient momentum by the time the shoulders 8 and 80 engage that the impact upon such engagement will loosen the head despite the fact that the latter may be stuck on its seat. Beyond this position, the parts move together until disc 18 has come to rest in contact with the bosses 19 (as shown in Figure 4), completing the magnetic circuit from end plate 11 to disc 18, thence through outer element 7 of the telescopic stem to the core piece 14. In the meantime, the upward movement of stem 6 will have compressed spring 17 to the extent shown in Figure 4.

When the movable core 7 and armature 18 come to rest (upon engagement of the latter with the bosses 19) the momentum of the parts 5 and 6 may carry them upwardly beyond the relative positions shown in Figure 4, possibly as far as the extreme position shown in Figure 1. The spring 17 cushions this overrunning of the parts 5 and 6 and brings them gently to rest, thus reducing the mechanical shock tending to loosen the connection between the solenoid and the valve body, and eliminating the consequent noise.

When the armature 18 contacts the projections 19, the path of least magnetic resistance, between plate 11 and element 7, is through armature 18 and about the shading coil 20. The interposition of the non-magnetic sleeve 16 between plate 11 and element 7, together with the relatively low and progressively decreasing cross section (transverse to the flux path) of plate 11, adjacent the center (note that the flux path through the lower end plate 11 is of but half the area of the flux path through plates 12), effectively diverts the main flux through armature 18. In this position, the induced magnetic flux, incident to the shading ring 20, is out of phase with the principal magnetic circuit and maintains the disc 18 firmly seated upon the projections 19, which, being a three-point contact, is not subject to vibration consequent to the cycling of the main magnetic field.

Upon deenergization of the solenoid, downward movement of the parts is initiated by spring 17, which has been under stress sufficient to move the parts against the restraining force of any residual magnetism. Once downward movement of elements 7 and 18 is initiated, the parts continue to fall together (with the shoulders 8 and 80 in engagement or nearly so) until the head 5 has seated upon seat 4. During this falling movement, the elements 7 and 18 are lagging behind the elements 5 and 6 so that, after the latter have come to rest, the former will continue to move and strike a hammer blow driving the head 5 into firm engagement with seat 4.

From the foregoing description, those skilled in the art should readily understand that the invention accomplishes its objects and provides a highly efficient and reliable solenoid-operated gas valve. While one complete embodiment has been disclosed in detail, it is not to be understood that the invention is limited to the details thereof save as indicated in the appended claims.

Having thus described the invention, what is claimed and desired to be secured by Letters Patent is:

1. An alternating current electromagnet comprising, a solenoid having means providing a fixed magnetic path incomplete at one axial end and having an apertured magnetic end plate thereat, a core axially movable within said solenoid and through said apertured end plate, a magnetic armature extending radially from said core and arranged to axially engage said end plate when energized, a shading ring on and encircling said core adjacent said armature, and means for confining the engagement between said armature and said end plate to three limited areas radially outward from said core.

2. In a magnetically operated valve comprising, a casing having a partition extending thereacross, said partition having an apertured horizontal portion defining a valve seat, a movable valve member engageable with said seat to close said aperture and biased toward such engagement, a solenoid mounted upon said casing with a lowermost fixed magnetic member extending parallel to and spaced from the apertured portion of said partition, a valve stem of magnetic material constituting the core of said solenoid and extending through the center of said magnetic member for movement relative thereto, and a magnetic head extending radially from said stem between said magnetic member and said partition and positioned on said stem so as to engage said magnetic member radially outward of said stem when the solenoid is energized, the combination of a shading ring on said stem immediately above said head, and means for confining the engagement between said head and said fixed magnetic member to three limited areas radially outward of the shading ring.

LAWRENCE M. PERSONS.

REFERENCES CITED

The following references are of record in the file of this patent:

UNITED STATES PATENTS

| Number | Name | Date |
|---|---|---|
| 1,576,155 | Stevens | Mar. 9, 1926 |
| 1,814,563 | Tang | July 14, 1931 |
| 1,944,113 | Shenton | Jan. 16, 1934 |
| 2,114,961 | Gille | Apr. 19, 1938 |
| 2,121,657 | Fisher | June 21, 1938 |
| 2,207,082 | Wetzel | July 9, 1940 |
| 2,222,419 | McCarty | Nov. 19, 1940 |
| 2,291,599 | Ray | Aug. 4, 1942 |
| 2,348,556 | Matthias | May 9, 1944 |
| 2,360,945 | Garner | Oct. 24, 1944 |
| 2,405,370 | Ray | Aug. 6, 1946 |
| 2,456,394 | Fisher | Dec. 14, 1948 |

FOREIGN PATENTS

| Number | Country | Date |
|---|---|---|
| 616,502 | Germany | of 1935 |
| 857,532 | France | of 1940 |